United States Patent [19]

Kolibas

[11] Patent Number: 4,830,055

[45] **Date of Patent: * May 16, 1989**

[54] CIRCULATING AND DEAD END COLOR CHANGER WITH IMPROVED VALVES AND MANIFOLDS

[75] Inventor: James A. Kolibas, Broadview Heights, Ohio

[73] Assignee: Nordson Corporation, Westlake, Ohio

[ * ] Notice: The portion of the term of this patent subsequent to Apr. 14, 2004 has been disclaimed.

[21] Appl. No.: 5,201

[22] Filed: Jan. 20, 1987

Related U.S. Application Data

[62] Division of Ser. No. 680,351, Dec. 10, 1984, Pat. No. 4,657,047.

[51] Int. Cl.[4] .............................................. F16K 11/10

[52] U.S. Cl. .................................. 137/884; 137/541; 137/614.2

[58] Field of Search ...................... 137/597, 541, 614.2, 137/883, 884

[56] References Cited

U.S. PATENT DOCUMENTS

| | | | |
|---|---|---|---|
| 2,257,004 | 9/1941 | Fleming . | |
| 2,276,182 | 1/1957 | Gemderson . | |
| 2,776,182 | 1/1957 | Gunderson . | |
| 2,896,413 | 7/1959 | Hussey | 92/62 |
| 3,053,294 | 9/1962 | Anderson | 92/63 X |
| 3,145,930 | 8/1964 | Herklotz et al. . | |
| 3,176,922 | 4/1965 | Decker . | |
| 3,192,953 | 7/1965 | Wolf et al. | 137/614.2 X |
| 3,219,273 | 11/1965 | Cillen . | |
| 3,240,225 | 3/1966 | Barrows . | |
| 3,267,959 | 8/1966 | Savage | 137/541 X |
| 3,288,036 | 11/1966 | Fisher | 92/62 |
| 3,310,204 | 3/1967 | Zinman et al. . | |
| 3,334,648 | 8/1967 | Parbet . | |
| 3,348,774 | 10/1967 | Wiggins . | |
| 3,373,762 | 3/1968 | Korchak . | |
| 3,385,522 | 5/1968 | Kock | 239/104 |
| 3,403,695 | 10/1968 | Hopkins . | |
| 3,443,578 | 6/1969 | Hedin . | |
| 3,458,133 | 7/1969 | Wiggins . | |
| 3,477,870 | 11/1969 | Boretti et al. . | |
| 3,504,855 | 4/1970 | Volker . | |
| 3,550,625 | 12/1970 | Adams, Jr. | 137/614.2 |
| 3,558,051 | 1/1971 | Strickler et al. . | |
| 3,572,366 | 3/1971 | Wiggins . | |
| 3,598,322 | 8/1971 | Rupert et al. . | |
| 3,672,570 | 6/1972 | Scarbrough et al. . | |
| 3,674,205 | 7/1972 | Koch | 137/240 |
| 3,674,207 | 7/1972 | Carbonetti, Jr. et al. . | |
| 3,716,191 | 2/1973 | Knight . | |
| 3,857,513 | 12/1974 | Wiggins . | |

(List continued on next page.)

FOREIGN PATENT DOCUMENTS

| | | | |
|---|---|---|---|
| 2747707 | 8/1979 | Fed. Rep. of Germany . | |
| 7603654 | 4/1975 | France . | |
| 0747707 | 6/1977 | U.S.S.R. . | |
| 0713594 | 5/1980 | U.S.S.R. . | |

OTHER PUBLICATIONS

Research Disclosure (Dec. 1979), No. 188, Disclosure 18836 Color Change Paint System.

Kepner Products Company, Villa Par, I., 60181, brochure "Snap-Tite" Check Valves.

*Primary Examiner*—A. Michael Chambers

*Assistant Examiner*—John C. Fox

*Attorney, Agent, or Firm*—Wood, Herron & Evans

[57] ABSTRACT

Modular circulating and dead end color changers are made from synthetic materials inert to chlorinated hydrocarbon solvents. Universal supply and return manifolds have relatively smooth and uninterrupted walls defined, in part, by inlet and return valve surfaces, for easy solvent flow cleaning. Circulating high pressure color changers have improved actuators and circulating means including bypass lines for continuously recirculating both selected and non-selected paints. Valve sealing is enhanced by improved valves and pressure drop across each module is minimized by modular construction regardless of the number of modules used.

5 Claims, 5 Drawing Sheets

U.S. PATENT DOCUMENTS 3,870,233 3/1975 Wilhelm et al. .
3,924,810 12/1975 Otterstetter .
3,939,855 2/1976 Wiggins .
3,981,479 9/1976 Foster et al. .
4,083,493 4/1978 Wiggins .
4,106,699 8/1978 Holt .
4,163,523 8/1979 Vincent .
4,186,649 2/1980 Sendstrum .......................... 92/62 X
4,215,721 8/1980 Hetherington et al. .
4,230,270 10/1980 Poret .
4,231,392 11/1980 Allibert .......................... 137/606 X
4,248,379 3/1981 Hollstein et al. .
4,265,858 5/1981 Crum et al. .
4,311,724 1/1982 Scharfenberger .
4,337,282 6/1982 Springer .
4,375,865 3/1983 Springer .............................. 239/112
4,403,736 9/1983 Scharfenberger .
4,422,576 12/1983 Saito et al. .
4,489,758 12/1984 Malarz et al. .
4,497,341 2/1985 Wright .
4,627,465 12/1986 Kolibas et al. .................. 137/884 X
4,657,047 4/1987 Kolibas .......................... 137/240 X

CIRCULATING AND DEAD END COLOR CHANGER WITH IMPROVED VALVES AND MANIFOLDS

This is a division, of application Ser. No. 06/680,351, filed Dec. 10, 1984 now U.S. Pat. No. 4,657,047.

This invention relates to color changers and more particularly to color changers for selectively controlling the introduction of paint of various colors or types to an applicator for applying paint to an object.

Attention is directed to applicant's related, co-pending patent application, Ser. No. 680,134, now abandoned entitled "Color Changer," filed on even date herewith.

Many attempts and devices have been made to selectively control the supply of paint of various colors or types to an applicator such as an electrostatic spray gun. Such devices are generally referred to as color changers.

Many commercial paints have characteristics which require special treatment and any color changers used therewith should not interfere with such treatments For example, in a commercial painting operation, it is frequently necessary to utilize types of paint which are normally quite viscous or which contain a high degree of solids which must remain in suspension during painting.

It has been known to apply heat to viscous paint in order to thin it to produce more uniform spray results. When operation of the system results in flow stoppage, however, paint at the heater location may be charred or burnt, destroying its color, etc. Moreover, when paint having suspended solids is stopped, the solids tend to settle out of suspension, destroying paint uniformity.

In certain low pressure systems, operating at about 80 psi to about 200 psi, it has been known to continuously circulate the paint in order to maintain a constant paint flow past any heater and to retain any solids content constantly in suspension by means of the continuous flow.

Certain known prior recirculation devices of low pressure paint systems have included, for example, color changers having a plurality of paint valves provided with bellows for isolating the paint flow from the valve actuators. These bellows units function well in low pressure systems, however, are not usable in high pressure systems. The bellows units cannot stand the high pressures in excess of 1000 psi normally associated with high pressure systems, and they break or rupture under such pressures.

Accordingly, it has been one objective of the invention to provide a recirculating color changer for use with a high pressure painting system.

In prior color changers, it also has been known to clean the system between paint color selections. Typically, a selected color is shut off and solvent is run through the system to clean it internally such that a second selected color may not be contaminated by the previously used color. Such solvent flow may then be followed with an air purge prior to selection of a succeeding color.

Such prior systems involved two major disadvantages respecting the particular color changer apparatus. First, many changers incorporated manifolds and porting which presented many surface irregularities and interruptions. For example, the porting to the manifold from the paint valves was frequently deep. When that paint valve was shut, a dead end area leading into the manifold containing a slug of paint was left. Such areas are consistently very difficult to clean with a solvent flow since it was difficult, if not impossible, to direct the flow into the dead end areas. It was thus possible to leave paint of prior color in the system where it could bleed into a newly selected color, destroying its integrity and producing an undesirable color on any object being sprayed.

Moreover, the utilization of chlorinated hydrocarbon solvents, preferred for their cleaning capabilities, presented hazardous conditions when used with most color changers made of various types of metallic substances such as aluminum. Such solvents interact with aluminum to cause potentially explosive conditions. In order to avoid such dangers, manufacturers of color changers have used stainless steel for those print contacting components which would be subjected to chlorinated hydrocarbon solvents Stainless steel, however, is relatively heavy and very expensive.

Accordingly, it has been a further objective of the invention to provide a color changer having easily cleaned paint passageways with no dead end areas capable of harboring previous paints of different colors or types.

A further objective of the invention has been to provide a color changer for use in high or low pressure painting systems and with which chlorinated hydrocarbon solvents can be used without creating any adverse reaction or dangerous explosive condition.

A further difficulty with prior color changers lies in the operation of the paint valves. In high pressure systems, valves which are spring closed against system pressure may undesirably leak or open. Thus, where constant system pressure acts against closing spring bias, high pressure tends to open the valve.

Accordingly, it has been a further objective of the invention to provide a color changer where paint pressure is used to enhance valve sealing, and at the same time to maintain easily cleanable paint passageways throughout the system.

In another aspect of color changer apparatus used in low pressure systems, the pressure drop across the system may be critical. Specifically, many low pressure systems operate in the range of 80 to 100 psi. Where paint moving through the system is subjected to long or tortuous paths, small passageways and frequent restrictions, pressure drops across the color changer can be so significant as to drop the pressure of paint supplied at the spray gun to a level insufficient for desired, uniform spray patterns.

Accordingly, it has been a further objective of the invention to provide an improved color changer for use in a low pressure painting system and producing minimal pressure drops thereacross.

In the manufacture and use of color changers, it is desirable to maintain flexibility with respect to the number of colors which can be handled.

Accordingly, it has been a further objective of the invention to provide a color changer and a plurality of color modules, each of which can easily be added to the changer to control a desired number of paint colors, and while still maintaining an easily cleanable paint path and producing a minimum pressure drop thereacross.

In another aspect of the invention, it is desirable to produce color changers useful in both high and low fluid pressure systems. Even where paint valves are properly oriented according to the invention, paint at high pressure of 1000 psi or above may tend to retain the valves closed against the pressure of the valves' actuators. Accordingly, actuators providing increased opening forces are required for high pressure systems. While useful in lower pressure systems, such heavier duty actuators are more expensive than necessary when used in a lower pressure system.

Accordingly, it has been a further objective of the invention to provide an actuator which is easily modified for use in either low or high pressure systems, thus eliminating the use of heavier duty actuators than necessary in lower pressure systems.

Finally, and while recirculating color changers are the primary objective of the invention, it will be appreciated that certain painting operations require only a dead end, or non-recirculating color changer. For example, where paint heating or retention of solids in suspension is not a consideration, dead end changers may prove useful.

Accordingly, it has been a still further objective of the invention to provide an improved dead end color changer, in modular form, and having easily cleanable paint flow paths for chlorinated hydrocarbon solvent cleaning without creating an explosive danger, with minimum pressure drop thereacross.

To these ends, a recirculating color changer according to a preferred embodiment of the invention includes a plurality of module means, each including a and return manifolds. A bypass line around each module includes a restrictor or selectively operable valve, both for continuously returning paint of a non-selected color to the supply of paint of that color.

The universal manifolds are generally smooth-walled bores in each module and having paint openings therein for incoming or departing paint. Paint supply and return valves comprise valve disks having outer surfaces forming a continuing uninterrupted portion of the manifold walls, when closed, thus providing a manifold with substantially smooth and uninterrupted interior surfaces and no dead end areas which are difficult to clean.

Paint passageways within the manifold block are bored out to as large a diameter as possible, reducing pressure drop therethrough. Valve blocks housing the paint supply and return valves are mounted on the manifold blocks, further defining the modules. 1

The specific manifold and valve blocks are preferably made from plastic or other synthetic lightweight, low cost materials, and are generally inert to chlorinated, hydrocarbon solvents.

In a dead end color changer according to another embodiment of the invention, a plurality of module means forms the changer with each module means including a manifold block defining a portion of a single paint supply manifold. A check valve is disposed in each block and has a disk member forming a part of the manifold wall when closed, and extendible into the manifold when opened. A valve block housing a selectively operable paint supply valve is connected to the manifold block. When opened, the supply valve supplies paint under pressure to the check valve for introduction to the manifold.

Preferably, an additional valve block for a different color paint is disposed on the manifold opposite the first valve block and is identically structured. Another check valve inlet for this second color is provided at the manifold. A single module means, in this embodiment, thus provides two-color capability to the changer. The manifold and valve blocks are also made of plastic or synthetic material, as noted above.

In another aspect of the invention, actuators for the selectively operable paint .supply, return and restrictor valves of the preferred embodiment of the invention are pneumatically operated. For use in high pressure systems, such as system operating at 1000 psi or above, the actuators are provided with a boost piston above an initial piston attached to a valve actuator stem. An expansion chamber above each piston is pressurized to force the stem to open the valve, the force of both pistons being additive. The double piston actuator can be provided from a singe piston actuator, by the addition only of a modified first piston cap and of the second piston. This significantly reduces the actuator inventory required, and eliminates use of a heavy duty actuator in a low pressure system.

Accordingly, the invention provides a recirculating modular color changer for use in high pressure, as well as low pressure, painting system. Paint manifolds are substantially smooth walled and are generally non-interrupted, the space between the smooth wall and the valve surface not being significant in terms of cleaning by flowing solvent through the manifold. The manifolds are easily cleaned by solvent flow and no dead end areas exist to trap paint of previous colors.

Modular construction of manifold and valve blocks from synthetic materials permits use of chlorinated hydrocarbon solvents without explosive dangers, and also provides highly flexible apparatus, easily assembled for any number of anticipated paint colors or types.

Pressure drops are reduced by the modular structure and reduced paint path lengths and valve sealing is improved, reducing leaks.

These and other objectives and advantages will become readily apparent from the following detailed description of preferred and alternative embodiments of the invention, and from the drawings in which.

Figure 1:
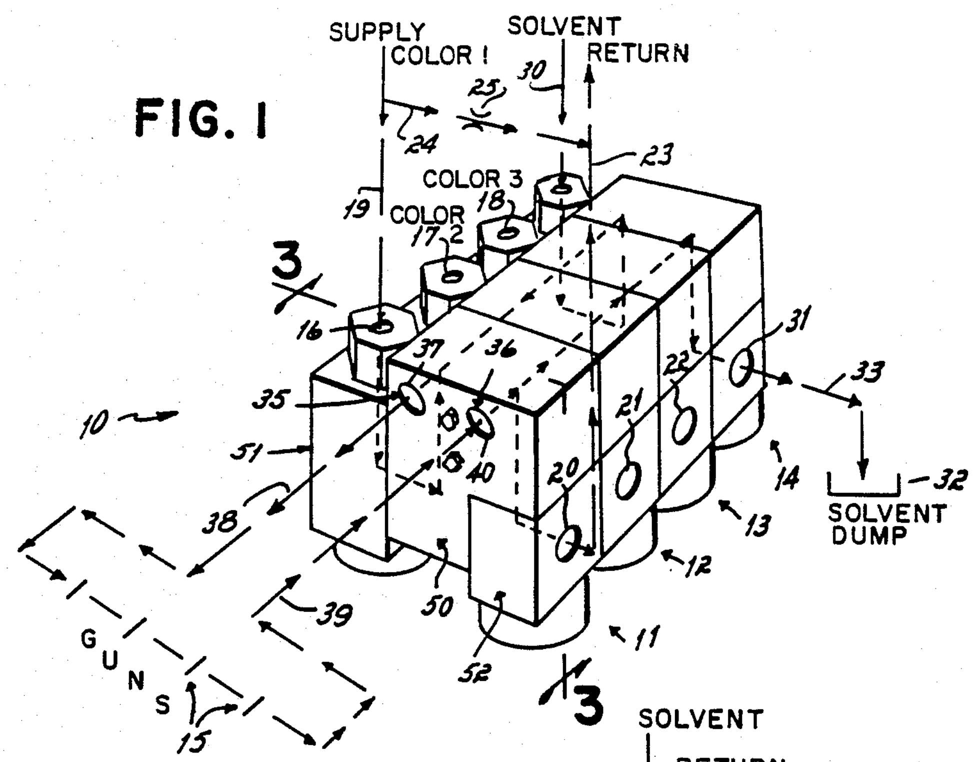
FIG. 1 is a diagrammatic perspective view of a recirculating color changer according to a preferred embodiment of the invention.

Turning now to the drawings, there is shown in FIG. 1 thereof a color changer 10 according to a preferred embodiment of the invention. Color changer 10 comprises, in the embodiment shown in FIG. 1, a first color module 11, a second color module 12, a third color module 13 and a solvent module 14, assembled together to provide a three-color color changer for selectively supplying these colors of paint to a paint applicator system. Such an applicator system may comprise a plurality of high pressure, airless paint spray guns or a plurality of low pressure spray guns as shown diagrammatically at 15. Each of the color modules 11–13 has a paint inlet port 16, 77 and 18, respectively, which is adapted to be connected to a supply of paint of a particular type or of a particular color. Paints of various colors, or paints of varying types, can be handled by the changer to provide paints of various colors or types selectively to the guns 15. Accordingly, each particular module is associated with a particular paint supply through a paint supply line, such as supply line or conduit 19 as shown in FIG. 1. Only one supply line 19 is shown for purposes of clarity, however, it will be appreciated that a similar supply line or conduit is provided to each of the modules and specifically to the ports 16, 17 and 18 from an individual and separate supply of paint or other fluid to be sprayed.

Moreover, each of the modules 11–13 includes a paint return port 20, 21, and 22, respectively, for returning paint, controlled by the particular module, to the supply of that particular paint. One paint return line or conduit line 23 is shown in FIG. 1 associated with module 11. The remainder of the return lines are not shown for purposes of clarity only, it being appreciated that each of the ports 20, 21 and 22 is connected to a separated return line leading to the supply of particular paint or fluid handled by that particular module. A bypass line 24 extends between the supply line 19 and the return line 23 for each of the particular modules, only one bypass line 24 being shown in FIG. 1 for clarity. Bypass line 24 includes a paint pipe or conduit having a restrictor means 25, as diagrammatically shown in FIG. 1. Restrictor means 25 preferably comprises a restriction, such as an orifice of reduced flow area as compared to conduit 24, in the line 24 for the purpose of providing a pressure drop between lines 19 and 23.

Alternatively, the restriction necessary to module operation may be provided by reducing the flow capacity of the entire conduit 24 with respect to supply conduit 19, or a variable restrictor, such as a pneumatic fluid regulator, could be used.

Restrictor means 25 serves several functions. For example, when the paint associated with the particular color module, such as module 11, is not being selected for painting, paint is still supplied through the supply line 19 to the module 11. However, since the module is not functioning to provide paint of that particular color or type to the guns 15, the paint pressure backs up in line 19 and runs through the bypass line 24, the restrictor means 25, to the return line 23, where paint is returned to the supply of that particular color or type. The restrictor means is selected such that paint may continually flow through the bypass line 24 in this condition, providing for a continuous recirculation of paint in the supply and return lines. Preferably, bypass line 24 is connected as close as possible to the port 16 in line 19 and to the port 20 in return line 23, so as to minimize the amount of paint in the module 11 bypassed by the line 24.

It will be appreciated that a check valve 26 is provided within the return line 23 between the connection of the bypass line 24 and the port 20 of the module 11, so as to prevent any paint backflowing through the module from the bypass line 25.

When the module is operated so as to provide paint of the particular color supplied in line 19 to the guns 15, the paint circulates through the line 19, through the module 11, and to the guns 15. Any excess paint which is not applied, or which bypasses the gun then is shut down, returns to the module and exits through port 20 and the return line 23 back to the supply for that paint.

As noted above, the restrictor means 25 is selected within the bypass line 24 so as to supply sufficient back pressure within the line 24, upstream of the restrictor, in order to prevent any significant pressure drop in the paint of supply line 19 to the module and out to the guns 15. Accordingly, the restrictor means 25, and its flow parameters, are selected so as to provide a continuous recirculation of paint between lines 19 and 23, when paint of the particular color handled by that module is not being utilized, and at the same time provides a sufficient back pressure to assure a sufficiently high pressure in paint line 19 when paint in that line is being directed by the particular module to the guns 15 and despite some continued recirculation of the selected paint through line 24 and restrictor 25.

In addition, and as shown in FIG. 1, the color changer 10 includes a solvent module 14 which is connected, via an appropriate conduit 30, to a supply of solvent. When it is desired to clean the color changer, the respective colors modules 11–13 are closed to stop paint flow to the guns. Solvent module 14 is then operated to convey solvent from the supply line 30 through the solvent module and throughout the color changer to guns 15. From guns 15, the solvent returns to the solvent module 14 and exits through an exit port 31 to a solvent dump 32, preparatory to selecting another color of paint for supply to the guns 15.

Also, and if desired, a further air valve (not shown in FIG. 1) can be supplied upstream of the solvent module 14 to selectively provide a source of pressurized air for purging the paint passageways within the changer 10, and to the guns 15, after solvent has been used to clean such passageways. This insures the removal of solvent and any remaining paint from those lines prior to the selection of another color.

It will further be appreciated that the color changer 10 includes a universal paint supply manifold 35 and a universal paint return manifold 36. As wil be shown, these are comprised of a plurality of smooth manifold bores associated in the respective manifold blocks of each of the modules as described above. It will be appreciated that the universal paint supply manifold 35 has an exit port 37 for connection to a paint supply line 38 leading to the guns 15. A paint return line 39 leads from the guns 15 to an inlet port 40 of the universal paint return manifold 36. The respective ports 37 and 40 are particularly adapted for connection to the lines 38 and 39, respectively.

Figure 3:
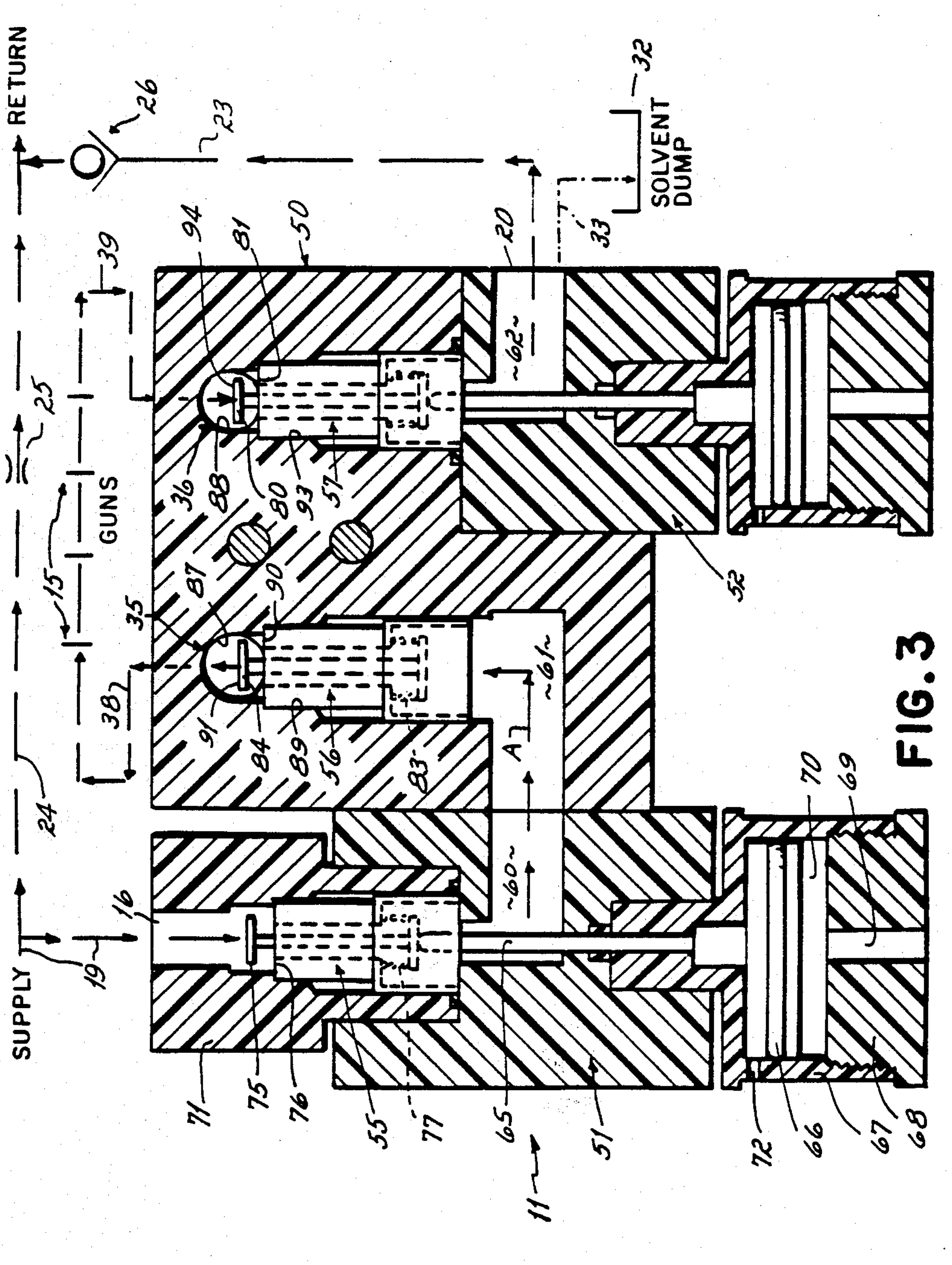
FIG. 3 is a cross-sectional, diagrammatic view taken along lines 3—3 of FIG. 1.

FIG. 3 of the drawings is a cross-section of 1 one of the color modules, such as module 11 of FIG. 1. Each of the modules is similar and thus a description of the module, such as module 11, will suffice for a description of the other color modules.

Each of the modules 11–13 includes a manifold block or body 50, a paint supply block or body 51, and a paint return block or body 52. A paint supply valve means 55 is mounted in the body 51 and is connected to a supply line 19, which in turn is connected to a supply of paint of a particular color or type to be handled by the module 11. Valve 55 preferably comprises a selectively operable check valve of the type as disclosed in U.S. Pat. No. 3,981,479, and particularly FIG. 7 thereof. U.S. Pat. No. 3,981,479 is herewith incorporated herein by reference for disclosure purposes. A similar check valve comprising inlet valve means 56 is mounted in the manifold block 50, and an additionally similar manually operable check valve comprising paint return valve means 57 is also mounted in the manifold block 50.

It will be appreciated that each of the bodies or blocks 50, 51 and 52 are manufactured from a synthetic material, such as plastic or such as the material known as "Delrin" which is a synthetic material manufactured and sold by E.I. DuPont Nemours & Company, Inc. As such, the Delrin material, or any particular synthetic material selected for use, is and should be inert to chlorinated hydrocarbon solvents so that the material does not interact with the solvent to produce any potentially dangerous or explosive reaction.

As shown in FIG. 3, the paint supply block 51 includes a paint passageway 60 operatively associated with the passageway 61 in the manifold block 50. The paint return block 52 includes a paint passageway 62 associated with the paint return valve means 57 for conveying paint to the paint return line 23. Each of the passageways 60, 61 and 62 are made as large in diameter as possible in order to provide as large a cross-sectional flow area as possible for the paint therein. For example, the passageways 60, 61 and 62 have approximately the same internal diameter as the external diameter of the particular valve means 55, 56 and 57.

The paint supply valve means 55 and the paint return valve means 57 are each provided with actuators for selectively opening the valves. In particular, the actuator means for the valve means 55, for example, includes a valve stem 65 attached to a pneumatically operated piston 66. Piston 66 resides in a cylinder 67 capped by a cap 68. Cap 68 has a port 69 which is adapted for connection to a selectively actuable source of pressurized air for charging the expansible chamber 70 between the cap 68 and the piston 66. This drives piston 66 and stem 65 inwardly to open the valve means 55. Port 72 is provided within the cylinder 67 for evacuating and venting the area beneath the piston 66.

In this regard, it will be appreciated that the valve means 55 comprises a check valve having an annular seat 76 and a valve stem mounted and disk-like 55 for closing the annular seat 76. Specifically,, when the valve stem and disk-like member are moved downwardly, as seen in FIG. 3, the member 75 engages the seat to close the valve. This would occur, for example, when air pressure is released from the expansible chamber 70 and the valve spring 77 is operable to lower (as viewed in FIG. 3) the disk-like member 75 to seat and to close the valve. When the pressurized chamber 70 is pressurized, however, the stem 65 is urged forwardly or upwardly, engages the valve stem of valve 55 and urges the disk-like member 75 upwardly, as viewed in FIG. 3, to open the valve.

The paint return valve 57 and its associated actuator operate in the same manner and will not be further particularly described, with the exception of the relationship of the disk-like valve member 80 of the valve 57 and its respective cooperation with the universal return manifold 36 and the annular seat 81 of the valve 57.

It will be noted that the check valve mean 56 is similar to the check valve means 55, but has no actuator, such as that provided for the valve 55. In this regard, it will be appreciated that paint moving in the direction of the arrows "A" is provided in sufficient pressure to enter the valve 56 from the lower or rearward end thereof, as seen in FIG. 3, in order to compress the valve spring 83 (similar to the valve spring 77) to open the disk-like member 84 to admit paint supplied through the line 19 and the valve 55 to the universal supply manifold 35. Disk member 84 enters the manifold 35 when inlet valve 56 is opened.

Further describing the details of the module 11, it will be appreciated that the paint supply block 51 is provided with a paint inlet and valve positioning fitting 71, which is also made from a synthetic or plastic material, such as Delrin and thus inert to chlorinated hydrocarbon solvents.

As shown in FIG. 3, the bypass line or conduit 24 extends from the supply line 19 to the return line 23.

When the valves 55 and 57 are closed, so that module 11 is not being selected to supply paint to the guns 15, paint moves through the supply line 19 to the bypass line 24, through the restrictor means 25 and to the return line 23. On the other hand, when the module is controlled to provide paint from the supply line 19 to the guns 15, the valves 55 and 57 are selectively opened, whereby paint moves through valve 55, passages 60, 61, check valve 56, into the universal supply manifold 35. From there, paint moves through the lines 38 to the guns 15, the return lines 39, the universal return manifold 36 and through the valve means 57 to the paint passageway 62 and the return line 23, where the paint returns to the supply of paint of that particular color or type. At the same time, some of the paint of the selected color recirculates through line 24 and restrictor 25 back to the paint supply. This maintains circulation of selected paint during painting and even when the guns are shut down. However, the restrictor is selected so that the pressure drop it induces does not unduly affect paint pressure at the guns to generate spraying difficulties. Accordingly, recirculation is continually provided for both selected and non-selected paints and at all times.

Turning now to a more detailed consideration of the manifold block or body 50, it will be appreciated that each of the universal supply and return manifolds comprise a smooth walled, generally cylindrical bore surface, such as shown at 87 and 88, respectively. It is desirable to maintain the universal manifolds 35, 36 with a wall surface which is as smooth and as uninterrupted as possible in order to provide for easy cleaning of such manifolds between the selection of different colors or types of paint In particular, and according to the invention, the manifold block 50, inlet check valve 56 and the return valve 57 are constructed and provided so that the respective manifolds 35, 36 are generally smooth and uninterrupted.

Specifically, it will be appreciated that the check valve 56 is set within a passage or bore 89 within the manifold block 50 extending into manifold 35 and defining an opening therein. The end 90 of valve 56 lies closely adjacent to the manifold 35. This orientation positions the surface 91 of the disk member 84 in the manifold such that the surface 91 substantially comprises a continuation of the smooth, generally uninterrupted, interior wall surface 87 of the manifold 35. Member 84, when closed, substantially fills the opening into the manifold 35 provided by passageway 89. It is recognized that the surface 91 ss relatively flat and is not concave or rounded. It thus does not constitute an actual geometric continuation of an accurate cylindrical surface. Nevertheless, it will be appreciated that the valve 56 is positioned so that the disk 84 is disposed in the manifold with surface 91 of the closed disk comprising a substantial continuation of the smooth wall 87 of the manifold 35, and closed disk 84 substantially filing the opening into the manifold 35. This eliminates any significant dead end spaces or interruptions which are difficult to clean by running solvent through the manifold 35. Accordingly, the surface 91 of the disk-like valve member 84, when the valve 56 is closed, provides a substantial continuation of the smooth uninterrupted wall surface of the supply manifold 35. Likewise, the return valve means 57 is positioned within a bore 93 such that the disk member 80, when closed, presents a surface 94 to the universal return manifold 36. The surface 94 constitutes a substantial continuation of the smooth wall portion 88 of the manifold 36, thereby substantially filling the opening to return manifold 36 and eliminating any significant dead end space or interruption within that manifold which may be difficult to clean by solvent flowing therethrough.

Thus, when valves 56 and 57 are closed, the interior walls of the universal manifolds in block 50 are substantially smooth and uninterrupted. There are no ports or dead ended passages extending therefrom.

Accordingly, it will be appreciated that the valve block 50 of the module 11 constitutes and defines portions of the respective universal supply and return manifolds. While the manifold block presents inlet and outlet means for paint flowing into manifold 35 and away from manifold 36, those manifold portions provided within the manifold block or body 50 are substantially smooth and continuous. They are free of any significant dead end space such as might otherwise appear by the utilization of simple ports or passageways leading to and from the respective universal manifolds with valves spaced some distance therefrom.

It will also be appreciated that the various blocks, such as manifold block 50, paint supply block 51 and paint return bloc 52, can be easily cast or molded by known manufacturing techniques and joined together as appropriate to constitute an integral module 11. Such joining can be obtained by any suitable sealing process which will integrally join the respective blocks, or by means of stack screws or locator pins, or the like (not shown) for securing the respective blocks together. Communicating passages running from one block to the other are sealed as necessary at any joint to prevent leakage.

While FIG. 3 diagrammatically illustrates a cross-section of any color module 11–13, such as module 11, a solvent module 14 is likewise constructed and is provided with respective valves as shown in FIG. 3 for the purpose of circulating solvent through the entire color changer. In this regard, it will be appreciated from FIG. 1 that a solvent module 14 is located upstream of the remaining modules. When solvent is introduced into the apparatus, it is introduced at upstream areas thereof and flows through the entire apparatus to the guns and then through the entire return manifold before being vented or exhausted to a solvent dump 32 through a solvent dump line 33, all as shown diagrammatically in FIG. 3 for the purpose of illustration. Of course, the solvent dump line 33 and the solvent dump 32 would not otherwise ordinarily appear in FIG. 3 with respect to a color changer module. Also, it will be appreciated that solvent is normally exhausted to a solvent dump and is not generally recirculated. Accordingly, there is preferably no bypass line 24 associated with the solvent module 14.

Likewise, a similar air valve may also be supplied to the color changer 10 upstream of the solvent module 14 so as to introduce air into the system upstream of the module 14 and throughout the various manifolds, conduits, guns, and the like in order to purge solvent and any remaining paint in the system therefrom prior to the change of a color. Purge air is preferably vented from the solvent dump and it is unnecessary to provide a separate air exhaust valve.

Accordingly, and in use in a color changer 10, a particular paint is selected such as paint color number 1. Module 11 is selectively operated with the respective actuators for the valves 55 and 57 being opened to permit paint of color number 1 to circulate through the module 11 to the guns 15 and back through the module to the return. Specific pneumatic control circuits for the color changer may be any suitable manually operated or programmed controls. These do not comprise any part of the present invention.

During painting, the restrictor 25 provides sufficient back pressure in the bypass line 24 such that paint is operatively conducted to the lines 38 and guns 15 at a pressure sufficient for effective spraying.

When another color or type of paint is to be selected, such as color number 2 of module 12, for example, the actuators for the valves 55 and 57 of module 11 are deactivated by selectively exhausting pressurized air from the expansible chamber 70. In this condition, the springs 77 close the respective valves 55 and 57 of the module 11 and paint color number 1 circulates through the inlet lines 19, the bypass line 24, and restrictor means 25 to the return line 23 and supply. Thereafter, the solvent module 14 is opened to circulate solvent through its supply valve and into the universal supply manifold 35 at an upstream most portion thereof. Solvent, such as solvent based on a chlorinated hydrocarbon, is thus circulated through the manifold 35, through the conduits 38 to the guns 15, the return conduit 39 and the return manifold 36, downstream of all color modules 11, 12 and 13. Solvent is then exhausted through port 31 and through a dump line 33 to a solvent dump 32 (FIG. 3). Thereafter, and if desired, air can be admitted to the system upstream of the solvent module 14 by an air valve (not shown) or an air module (also not shown) for purging the system of solvent and any remaining paint. Alternatively, an air valve can be supplied in the solvent line 30 to direct pressurized air through the solvent module, the air being eventually vented to the port at 31 and into the solvent dump.

Alternative Embodiment

Figure 2:
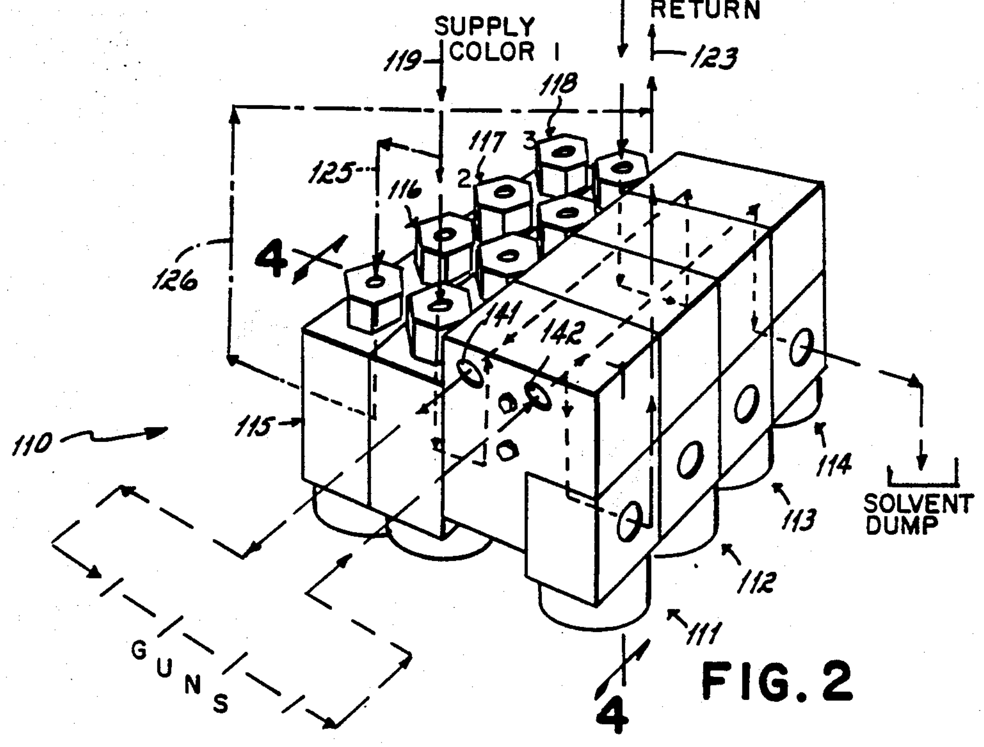
FIG. 2 is a diagrammatic view similar to FIG. 1, but showing an alternative embodiment of the invention.

Turning now to FIG. 2, there is shown a color changer 110 according to an alternative embodiment of the invention. Color changer 110 is identical to the color changer 10, with the exception of the addition of additional bypass valves 115, 116 add 117 associated with the respective color modules 111, 112 and 113. It will also be noted that there is no open bypass line connected directly between the supply line 119 and the paint return line 123. Each of the modules 111, 112 and 113 is provided with a separate paint supply line 119 and a separate paint return line 123 corresponding to the lines 19 and 23 of the color change 10 of FIG. 1. Instead of using a bypass line and a restrictor means as described with respect to a preferred embodiment, a respective bypass valve 115, 116 or 117 is connected in a bypass line 125 and 126 extending from a supply line 119 to a return line 123 for each module It will also be appreciated that a check valve 143 is included in the paint return line 123 of the respective color modules to prevent any paint under pressure in the bypass lines 125 and 126 from flowing backwardly into the paint return valves 129 of the color changer 110, as shown in FIGS. 2 and 4.

Figure 4:
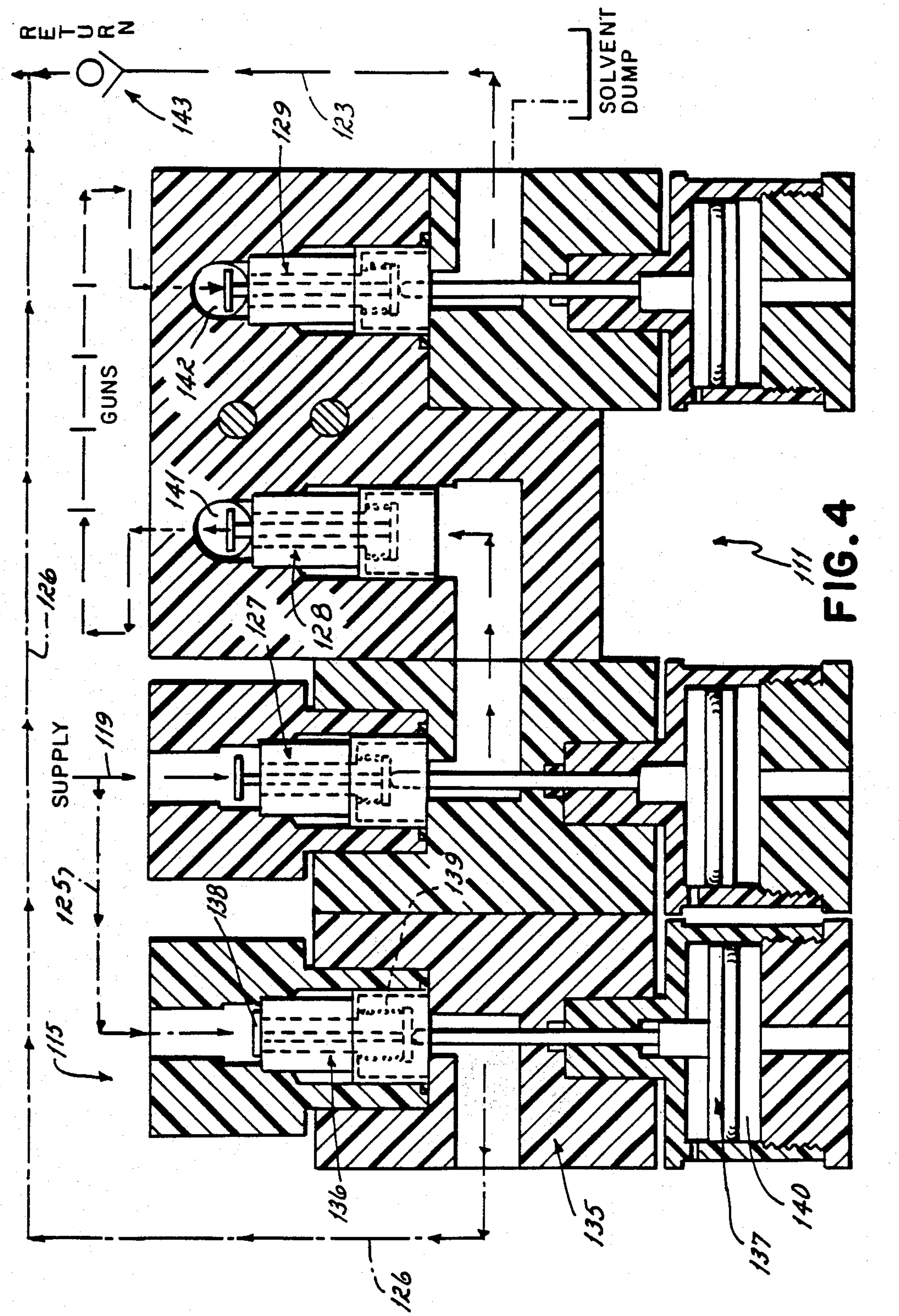
FIG. 4 is a cross-sectional, diagrammatic view taken along lines 4—4 of FIG. 2.

The operation of the additional bypass valves 115, 116 and 117 are seen more clearly from 1 FIG. 4, which is a diagrammatic cross-section taken 1 through the module 111.

It will be appreciated from FIG. 4 that the color module 111 includes a paint supply valve 127, an inlet check valve 128 and a paint return valve 129. These correspond respectively to the valves 55, 56 and 57 of the preferred embodiment as shown in FIG. 3. In addition, however, the embodiment of FIGS. 2 and 4 includes a bypass valve block 135 housing a bypass valve means 136 selectively actuable by actuator means 137, to close off paint flow from line 125 to line 126. Actuator 137 is identical to the actuator as has been described with respect to the valve 55 of the preferred embodiment.

Valve 136 includes a disk-like valve member 138 for closing the valve 136 when moved downwardly, as viewed in FIG. 4, by means of the valve spring 139. Alternatively, when chamber 140 is pressurized, disk member 138 is moved upwardly, as viewed in FIG. 4, to open the valve 136.

Accordingly, when the module 111 is operated to provide paint to paint spraying guns, diagrammatically shown in FIG. 2, the actuators for the valves 127 and 129 are operated to open those valves in a manner similar to that as described above with respect to FIGS. 1 and 3. Paint moves from the supply line 119 through valve 127 and check valve 128 into a universal paint supply manifold 141. From there, paint flows to the guns and to a universal paint return manifold 142. From there, the paint moves through the paint return valve 129 and to the paint return line 123 to a supply of paint of that color. No paint flows through lines 125, 126 since bypass valve 136 is closed.

On the other hand, when a paint color number 1, such as controlled by the module 111, is not being selected, the actuators do not operate the valves 127 and 129. The valves are closed by means of their respective springs to cut off any flow of paint of color number 1 to the manifold 141. At the same time, the actuator 137 for the bypass valve 136 is operated to open the valve 136 and thus move the disk 138 upwardly. This permits the paint in the supply 119 to flow through the bypass line 125, through the valve 136, and into the bypass line 126. Bypass line 126 is connected to the return line 123 and paint thus flows through the valve 136 back to the supply of paint of color number 1. In this regard, it will be appreciated that no restrictor is required since the valve 136 is closed during operation of the module 111 to supply paint to the guns and thus there is no leakage or pressure drop of paint in the system, such as provided by the constantly open restrictor as described with respect to FIG. 3.

As appreciated above, the cross-section of FIG. 4 is also illustrative of a solvent module 114, with the exception that it is not necessary to provide any solvent module 114 with a valve block 135 or valve 136. Recirculation of solvent, when solvent is not being selected for flow through the system, is not believed to be required. In FIG. 4, the solvent dump is diagrammatically shown on the righthand side of the figure for the purpose of illustrating the exhaustion of the solvent to a solvent dump through a solvent module 114. Of course, solvent does not normally exit from a color module, such as module 111 of FIG. 4.

High Pressure Actuator

Figure 7:
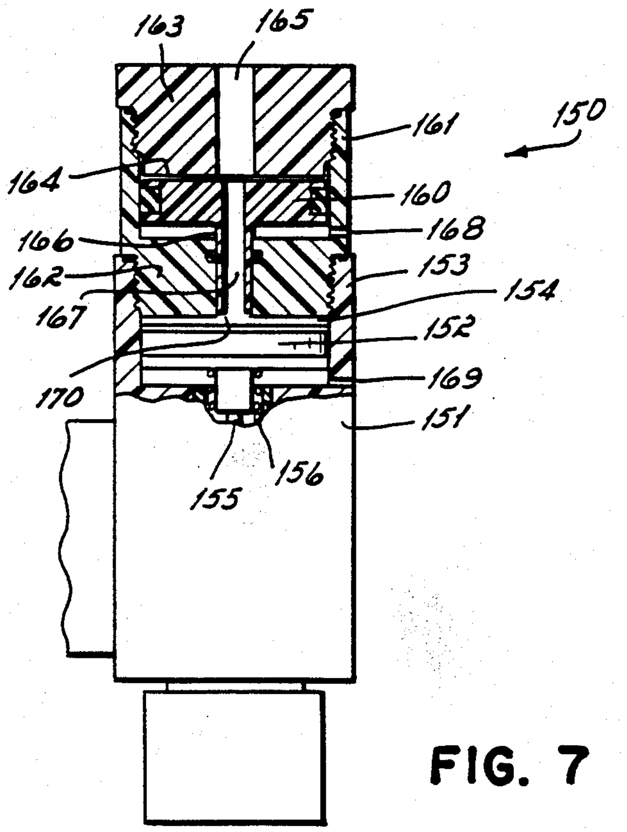
FIG. 7 is a cross-sectional view of a dual-piston paint valve actuator according to the invention.

Turning now momentarily to a further alternative embodiment of the invention, attention is directed to FIG. 7 which illustrates, in partial cross-section, an improved pneumatic actuator means for a valve which is to be utilized in a high pressure painting system.

It will be appreciated that the color changers 10 and 110, as described above, may be used with low pressure painting systems, such as those pneumatically charged systems operating in the range of 80 to 200 psi. Likewise, the color changers 10 and 110 may also be utilized in a high pressure system, such as in an airless spraying system operating at fluid pressures at and above 1000 psi. In this regard, while the actuators as heretofore described with respect to the various paint modules, may be utilized in high pressure systems, it is preferable to provide an improved actuator which supplies increased opening forces to the respective inlet and return valves. This insures that the paint under these high pressures will not be sufficient to prevent opening of the valves. In particular, FIG. 7 illustrates an improved actuator 150 comprising an actuator body 151, a first pneumatically actuated piston 152, a cylinder 153 and an expansible chamber 154. Piston 152 is connected to an actuating stem 155 extending downwardly as viewed in FIG. 7 for engagement with a valve means such as a paint supply valve 55 or a paint return valve 57. Spring 156 urges piston 152 upwardly, as viewed in FIG. 7, to permit the associated valve to close when expansible chamber 154 is not charged with pressurized air.

In order to increase the opening forces provided by the piston 152, a second piston 160 is disposed above piston 152. Piston 160 resides in a cylinder, defined in part by a skirt 161 forming an integral part of and extending upwardly from a cap 162 which has been modified by the addition of the skirt 151. A cap 163 is screwed into the skirt 161 above the piston 160 to define an expansible chamber 164 above the piston 160. Cap 163 is provided with a port 165 for connection to a source of pressurized air (not shown) for the purpose of pressurizing the chamber 1 164.

Piston 160 is provided with a downwardly extending tubular member or stem 166 and an air passageway or bore 167 extends through the piston 160 and the stem 166 and communicates between the expansion chambers 164 and 154. Port 168 provides venting beneath the piston 160 and port 169 provides venting between the piston 152.

When pressurized air is supplied at the port 165, it expands into the expansion chamber 164 and, as well, is communicated through the passageway 167 into the expansion chamber 154. The downward pressures exerted on the respective pistons 160 and 152 by the introduction of such pressurized air are additive and supply increased forces for the stem 155 to open its associated valve.

In particular, when the chamber 164 is expanded by the introduction of pressurized air thereto, piston 160 moves downwardly and the lower end 170 of stem 166 engages the top of piston 152 to urge it downwardly as well. The lower end 170 of the stem 166 may be convoluted or ported so that engagement of the stem with the piston 152 does not cut off the supply of pressurized air to the chamber 154.

In this regard, and returning momentarily to FIG. 3 for example, it will be appreciated that the disks 75 and 80 of the selectively operable valves 55 and 57, respectively, must be moved upwardly (a viewed in FIG. 3) to open against the pressure of paint. When this pressure is very high, such as in an airless spraying system and on the order of 1000 psi or more, the utilization of the double piston actuator as shown in FIG. 7 is particularly useful to open the valve disks 75 and 80 against such pressures. Of course, it will also be appreciated that pressure existing in the supply line 19 or in the supply line 119, for example, serves to aid and enhance the sealing of the paint supply valves 55 and 127, respectively, such that the color changers are not subject to leakage occasioned by the application of supply pressure to the respective supply valves.

It should be noted that actuator 150 differs from actuator 137 only by the addition of modified cap 162 and piston 160. Cap 163 is merely located on the skirt 161 of the modified cap such that by the application of only two additional parts, that is the modified cap and second piston, the actuator can be easily modified to efficiently and consistently handle paint in a color changer at relatively high pressures, even though the color changers as described herein can also be used with low pressure systems, as noted above. Thus, a single piston actuator can be made and only two additional parts inventoried in order to provide a dual piston actuator.

Dead End Color Changer

It will be appreciated that the recirculating color changers as described above have particular application where paints must be heated or where solids in such paints must be retained in suspension. In particular, these color changers provide for continuous recirculation of paint at a time when paint of that color or type is not being selected. Even at a time when such paint is selected, recirculation of 1 unused or unapplied paint continues through the system. This prevents paint burning and the settling out of solids from suspension.

Nevertheless, it is appreciated that there are painting applications wherein it is suitable to use a "dead end" color changer. Such dead end color changers have been used before in connection with high pressure systems. Where it is not necessary to provide for a recirculation of paint such dead end color changers may prove suitable.

Figure 5:
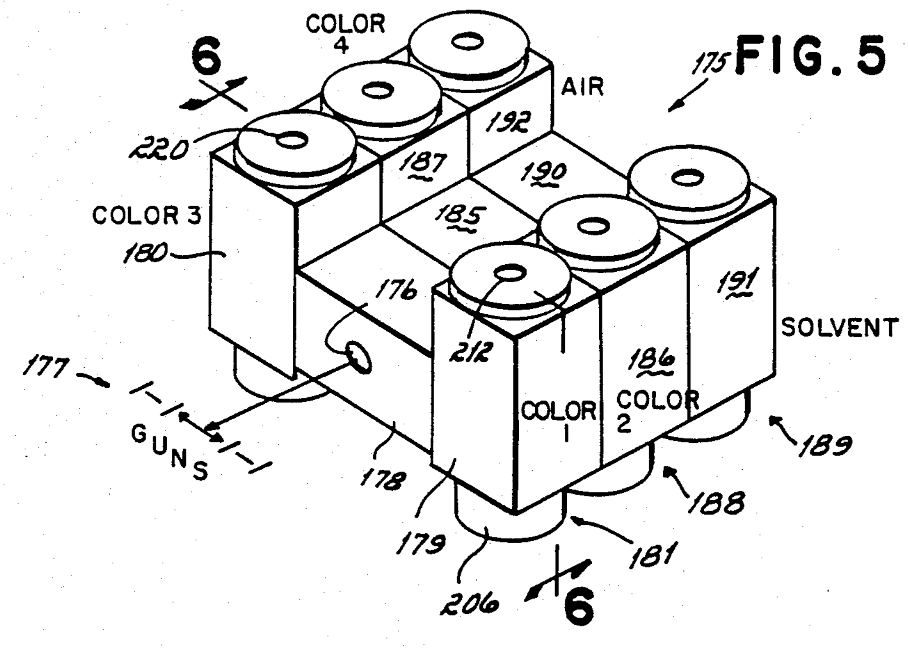
FIG. 5 is a diagrammatic perspective view of a dead end color changer according to an alternative embodiment of the invention.
Figure 6:
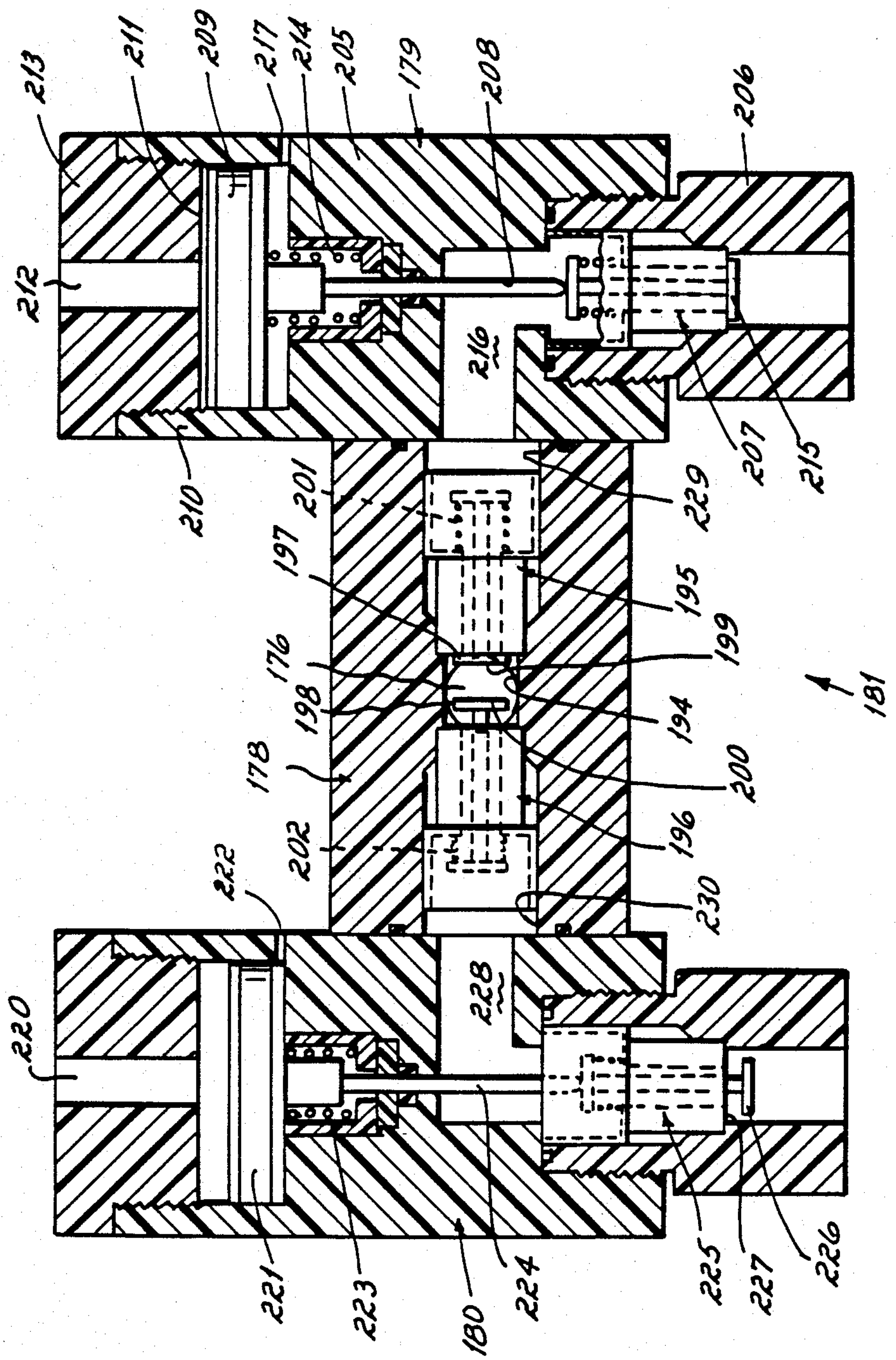
FIG. 6 is a cross-sectional view taken along lines 6—6 of FIG. 5.

According to a still further embodiment of the invention, then, various advantages of the invention are provided in a dead end color changer such as shown in FIGS. 5 and 6. In particular, the specific valve orientation so as to prevent system pressure from tending to open the valves, as well as a universal supply manifold which remains relatively smooth and without significant interruptions so that it can be easily cleaned, are provided in a dead end color changer such as the changer 175 of FIG. 5.

The changer 175 may comprise a four-color color changer comprising a plurality of modules, each of which are capable of delivering two colors to a universal paint supply manifold 176. Supply manifold 176 is adapted for operative connection to a paint applicator system such as a plurality of spray guns 177.

In particular, the color changer 175 is made of a plurality of modules, each module comprising a manifold block 178, a first paint color supply valve means 179 and a second paint color supply valve means 180. Accordingly, a first two-color module 181 comprises a manifold block 178 and paint supply valves 179 and 180. A second two-color module may comprise a paint supply manifold block 185, a third color supply valve means 186 and a fourth color supply valve means 187, all of which comprise a second module 888. Finally, a third module comprising a cleaning module 189 includes a manifold block 190, a solvent supply valve 191 and an air supply valve 192.

It is to be noted that the manifold blocks 178, 185 and 190 each define portions of a universal supply manifold for connection to the guns 177. No return manifold is provided since the dead end color changer does not include a specific return function. Instead, solvent and air may be dumped and vented through the guns 177.

FIG. 6 is a diagrammatic cross-section taken along lines 6—6 of FIG. 5 and specifically through the two-color module 181. From FIG. 6 it will be appreciated that the manifold block 178 defines a portion of a universal manifold 176 having a relatively smooth and generally cylindrical interior wall 194. A paint inlet check valve 195 for paint color number 1 and a paint inlet check valve 196 for paint color number 2 are disposed on opposite sides of the universal supply manifold 176.

These valves are also similar to the check valve disclosed in U.S. Pat. No. 3,911,479 and particularly in FIG. 7 thereof. Each of these valves includes, respectively, a flat disk-like valve member 197 and 198 which have respective outer surfaces 199 and 200. Each of the valves is provided with a respective spring 201, 202 for urging the valve members to a shut condition, such as that shown for valve 195. The valves can be opened to admit paint behind the valves to the manifold 176 upon the application of paint pressure thereto from a rear end of the valves, that is from the right end of the valve 195 as shown in FIG. 6, and from the left end of the valve 196 as shown in FIG. 6.

The paint inlet valve 179 for color number 1 includes a valve body 205, preferably manufactured from a synthetic or plastic material, such as Delrin, and a fitting 206 housing a paint supply valve 207. Supply valve 207 also comprises a check valve of the type shown in U.S. Pat. No. 3,981,479. Body 205 also houses an actuator means for the valve 207, and comprising an actuator stem 208 controlled by a pneumatically operated piston 209 residing in a cylinder 210. An expansible chamber 211 is defined above the piston 209 and when air is admitted through port 212 in a cap 213, the piston 209 can be driven downwardly against the spring 214 to drive the step 208 downwardly and to open the disk member 215 of the valve 207, thereby permitting paint of color number 1 to move through the valve 207 into the valve passageway 216 and through valve 195 into the manifold 176. Port 217 permits evacuation of any air beneath piston 209. This actuator means is similar to that actuator 137 as described with reference to FIG. 3. Any suitable pneumatic control means for these actuators can be used and they comprise no part of this invention.

Of course, as shown in FIG. 6, valve 179 is closed such that disk 215 seats on the annular seat provided in valve means 207. Paint of color number 1 cannot move through valve 207, nor into the chamber 216 nor through the valve 195. Accordingly, valve 195 is urged closed by its spring 201 and by any pressure of paint, solvent or air existing in the manifold 176 to prevent leakage back into the valve 195 of any such other color of paint, solvent or air.

Turning now to the supply valve member 180 for color number 2 in FIG. 6, it will be appreciated that the valve is identical to the valve as described with respect to color number 1. In valve 180, air has been introduced to port 220 and air beneath the piston 221 has been exhausted through port 222. Piston 221 is moved downwardly against spring 223 to urge stem 224 into contact with the valve means 225, thereby moving the disk-like valve member 226 away from its seat 227 on the valve 225 and permitting paint of color number 2 to move through the valve 225, through the chamber 228 and through the valve 196. This paint pressure open the disk valve member 198 into the manifold 176 and permits paint of color number 2 to enter the universal supply manifold 176 for conduction to the spraying apparatus or guns 177.

As noted above, manifold block 178 defines a portion of the universal supply manifold 176 which has a generally smooth, cylindrical interior wall 19.. It will also be appreciated that the surfaces 199 and 200 of the respective valves 195 and 196 comprise substantial continuations of such smooth wall 194 so that no dead end areas or significant irregularities are accessible along the manifold 176. Of course, it is appreciated that the surfaces 199 and 200 are relatively flat, however, for purposes of this description, they comprise substantial continuations of a relatively smooth and uninterrupted interior wall 194 to provide an easily cleanable universal supply manifold 176 in a dead end color changer. The relationship of surfaces 199 and 200 and of disks 197 and 198 to the manifold 176 and manifold surface 194 is similar to that described above with respect to manifolds 35, 36 and elements of respective valves 56, 57 (FIG. 3). Accordingly, manifold 176 is easy to clean by running solvent through such manifold. A subsequent air purge can be utilized to clean solvent and remaining paint therefrom.

In this connection and returning momentarily to FIG. 5, it will be appreciated that the module 189 comprises a cleaning module which is identical to the other modules and to the cross section as shown in FIG. 6. When it is desired to change colors, all of the color modules 181 and 188 are closed so as to prevent paint of any color from entering the supply manifold 176. Thereafter, the solvent valve is opened, permitting solvent to enter the paint manifold, upstream of all of the color modules, and to move through the manifold 176 to the guns 177, where the solvent can be vented or dumped. Thereafter, the solvent valve may be closed and the air valve 192 opened to purge the manifold 176 and the downstream conduits and guns. When air purging is completed, the air valve is closed and the paint supply valves of any of the modules can be opened to supply paint of guns 177.

It will be appreciated that the chambers 216 and 228 of the respective paint supply valve bodies are enlarged to a diameter substantially like that of the inlet diameters of the ports shown in the fittings, such as fitting 206. As well, the bores 229 and 230 housing valves 195 and 196 are also relatively large and the paint passageway throughout the various modules is relatively unrestricted, thereby reducing any pressure drop across the color changer.

It will also be appreciated that the color changer of FIGS. 5 and 6 can be utilized in a high pressure paint spraying system, such as in an airless system in pressures at and above 1000 psi where it is not necessary to recirculate the paint. This may be accomplished, for exampple, by using a valve actuator, such as that shown in FIG. 7, in place of the specific actuator shown in FIG. 6. In further connection with that particular actuator, it will be appreciated that the actuator is relatively easily assemble and that the actuator shown in FIG. 6 can be easily modified to high pressure operation by the mere addition of a modified cap, such as cap 162, FIG. 7, and the second piston 160.

In connection with the alternative dead end color changer as shown in FIGS. 5 and 6, it will be appreciated that the respective modules may be stacked together and that sealing means are provided between each of the manifold blocks for preventing leakage from the universal supply manifold which is defined by the plurality of manifold bores within the respective manifold blocks. These manifold blocks may be secured together by any suitable means such as by stacking screws (not shown) to provide a color changer for any number of various types or colors of paints to be supplied, it being relatively easy to simply add or subtract color modules from a particular changer to fit a particular application.

It will also be appreciated that the color changer is manufactured from a synthetic material which does not adversely react with chlorinated hydrocarbon solvents and thus provides a color changer to be used with those preferred solvents without creating any undue danger.

Moreover, it will be appreciated that the advantages of the smooth universal supply manifold are carried over into the alternative embodiment of FIGS. 5 and 6 and that such manifold and downstream lines can be easily cleaned by the flow of solvent therethrough, there being no dead end spaces or significant interruptions in the universal supply manifold which may harbor unused paint which could bleed into paint of a color selected later in the process.

It will be appreciated that the color changers described herein, according to the invention do not utilize any type of bellows unit for segregating or sealing off paint internally of the color changer. Accordingly, the color changers herein are suitable for use with high pressure systems, such as airless systems operating in the neighborhood of 1000 psi and above, and can provide recirculation in such high pressure systems.

The universal manifolds in association with the valve means as described provide smooth uninterrupted manifolds which can be easily and fully cleaned by solvent flow. The modular construction of the respective manifold and valve bodies from synthetic materials as described eliminates the generation of explosive conditions in the changers.

The specific valves, as described herein, utilize the pressure of paint supplied to the color changer in order to enhance the sealing of such paint from the universal supply and return manifolds. This prevents leakages and eliminates the possibility of excessive supply pressures inadvertently or undesirably opening a paint supply valve and destroying the integrity of paint of another color then being selected for application.

Moreover, additional modules to handle additional colors or types of fluids can be easily added to the changers described herein without unduly extending the universal manifolds, and pressure drops across the changers are held to a minimum.

The invention provides a large amount of flexibility by the use of easily connectable modules for the elimination or addition of paint colors or types.

These and other advantages will become readily apparent to those of ordinary skill in the art, without departing from the scope of this invention, and applicant intends to be bound only by the claims appended hereto.

I claim:

1. A dead end color changer comprising a plurality of modules for controlling the introduction of paint of varying colors to a paint applicator, each module comprising:

a manifold block having a passageway therethrough and defining, together with other manifold block passageways a common paint supply manifold adapted for connection to a paint conduit for conveying paints of various colors to a paint applicator;

at least one pressure operated check valve having a first valve member extendible into said passageway to pass paint of a selected color thereto and retractable to close said check valve;

said valve member, when closed, defining a portion of an interior wall of said supply manifold, said wall being substantially continuous and uninterrupted;

at least one paint supply block operatively connected to said manifold block; and a selectively actuable paint supply valve means in said paint supply block for selectively passing paint from a supply of paint of a selected color to said bore through said check valve.

2. A dead end color changer as in claim 1, wherein each module further includes a second pressure operated check valve having a second valve member extendible into said passageway opposite the first valve member to pass paint of a second selected color to said passageway and being retractable to close said second check valve when paint of another color than said second color is selected;

said second valve member, when closed, defining a portion of an interior wall of said supply manifold, said wall being substantially continuous and uninterrupted;

a second paint supply block operatively connected to said manifold block; and a second, selectively actuable paint supply valve means in said second paint supply block for selectively passing paint from a supply of paint of a second color to said passageway through said second check valve.

3. A dead end color changer as in claim 1, wherein said paint supply valve means includes a flat valve member movable in a direction against paint supply pressure to open said supply valve means to pass such paint therethrough, and said valve member, when closed, being urged into sealing position by pressure of said supply paint upstream of said valve means.

4. A dead end color changer as in claim 1, wherein said manifold block and said paint supply block comprise synthetic material.

5. A dead end color changer as in claim 4, wherein a plurality of said manifold blocks are operatively connected together to define said common paint supply manifold i a multiple-color color changer.

* * * * *

UNITED STATES PATENT AND TRADEMARK OFFICE

CERTIFICATE OF CORRECTION

PATENT NO. : 4,830,055

DATED : May 16, 1989

INVENTOR(S) : James A. Kolibas

It is certified that error appears in the above-identified patent and that said Letters Patent is hereby corrected as shown below:

Column 1, line 23, insert "." after the word --treatments--.

Column 2, line 17, "print" should be --paint--.

Column 2, line 19, insert "." after the word --solvent--.

Column 3, line 28, delete the word "and".

Column 3, line 45, delete the number "1".

Column 4, line 4, delete "." before the word "supply".

Column 4, line 13, "singe" should be --single--.

Column 4, line 67, "77" should be --17--.

Column 6, line 36, "wil" should be --will--.

Column 6, line 47, delete the number "1".

Column 7, line 36, after "disk-like", add --valve member 75 which is reciprocal within the valve--.

Column 7, line 37, delete one "," after the word "Specifically".

Column 8, line 39, after "paint", insert --.--.

Column 8, line 55, "ss" should be --is--.

Column 9, line 29, "bloc" should be --block--.

UNITED STATES PATENT AND TRADEMARK OFFICE

CERTIFICATE OF CORRECTION

PATENT NO. : 4,830,055

DATED : May 16, 1989

INVENTOR(S) : James A. Kolibas

It is certified that error appears in the above-identified patent and that said Letters Patent is hereby corrected as shown below:

Column 10, line 48, "add" should be --and--.

Column 10, line 68, delete the number "1" before "Fig. 4".

Column 11, line 1, delete the number "1" before "through".

Column 12, line 38, delete the number "1" before "164".

Column 12, line 65, "a" should be --as--.

Column 13, line 32, delete the number "1" before "unused".

Column 13, line 67, "888" should be --188--.

Column 14, line 20, "3,911,479" should be --3,981,479--.

Column 14, line 44, "step" should be --stem--.

Column 15, line 6, "open" should be --opens--.

Column 15, line 13, "19.." should be --194.--.

Column 15, line 47, after "of" insert --different colors or types to the manifold 176 and the--.

UNITED STATES PATENT AND TRADEMARK OFFICE

CERTIFICATE OF CORRECTION

PATENT NO. : 4,830,055

DATED : May 16, 1989

INVENTOR(S) : James A. Kolibas

It is certified that error appears in the above-identified patent and that said Letters Patent is hereby corrected as shown below:

Column 18, line 27, "i a" should be --in a --.

Signed and Sealed this

Tenth Day of July, 1990

*Attest:*

HARRY F. MANBECK, JR.

*Attesting Officer*

*Commissioner of Patents and Trademarks*